3,002,388
WHEEL BALANCING
Fred J. Bageman, Pasadena, Calif., assignor, by mesne assignments, to The Bada Company, Pasadena, Calif., a corporation of California
Filed Mar. 4, 1957, Ser. No. 643,761
2 Claims. (Cl. 73—483)

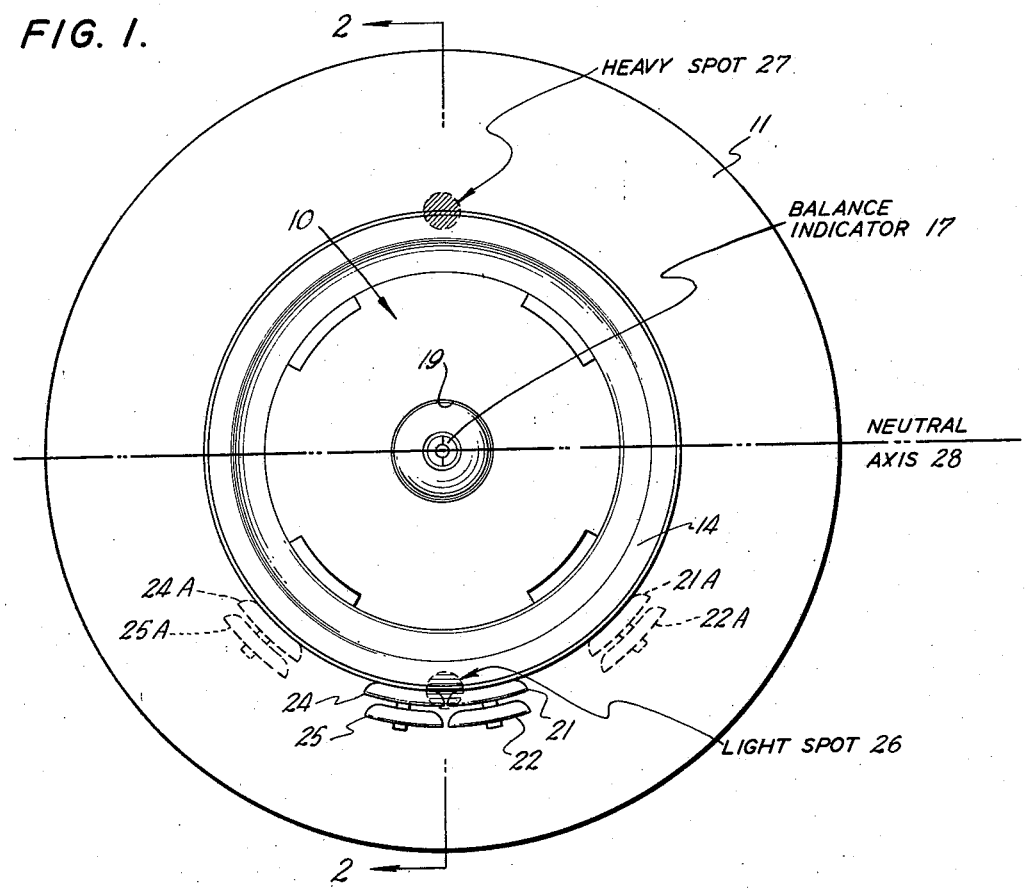
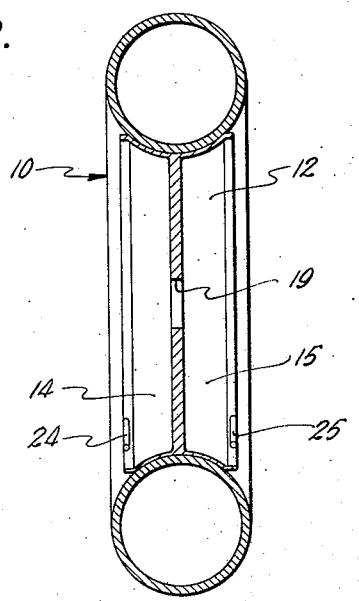
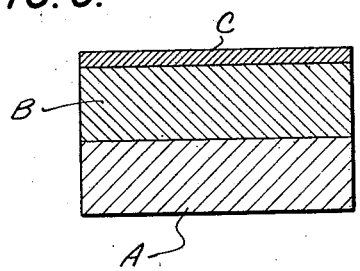

This invention relates to process and apparatus for balancing vehicle wheels.

Most vehicle wheels are dynamically balanced within acceptable ranges as they are normally received from the manufacturer. However, variables introduced by the addition of tires or tires and tubes to the basic wheel often lead to a condition of static unbalance. Conventionally, static unbalance is corrected by adding metallic weights to the rim of the wheel on the so-called "light" side of the wheel to compensate for the diametrically opposite heaviness of the wheel.

The degree of static unbalance varies considerably and as a result the stock of conventional counter-balancing weights consists of as many as 20 different weight sizes ranging from ¼ ounce upward. Normally, such weights are sold and stocked in packages each containing as many as one hundred weights of a given weight value. Stocking a complete size range to correct the majority of the statically unbalanced wheels normally encountered imposes a large inventory burden with attendant storage space problems and a perplexing re-supply problem. The purpose of the invention is to eliminate the necessity for maintaining a large stock of weights in sizes seldom used and at the same time afford a balancing process that is more rapid than conventional procedures and at the same time insures proper static balance with a minimum amount of weight mass.

Approximately one-third of the wheels in any given typical wheel group sample has a dynamic unbalance on the borderline of unacceptability. Therefore, the static balance must be achieved by a method that does not add to the marginal dynamic balance and increase it beyond acceptability.

My process for statically balancing each one of a representative number of automobile wheels without disturbing the dynamic balance thereof comprises a series of cooperative steps characterized by their systematic and uniform application from wheel to wheel, the first step of the series being that of placing a set of four equal rim weights sufficient to balance the wheel loosely on the wheel adjacent the point of maximum effectiveness. This is best done by loosely positioning successively heavier sets of four equal rim weights on one rim of a wheel adjacent the point of maximum effectiveness until the lightest of the sets which will balance the wheel is found. The rim weights of this set then are adjusted together in pairs symmetrically and oppositely about said point of maximum effectiveness until the wheel is balanced so that it is in a horizontal position. Thereafter, one rim weight is transposed from each pair from the outboard rim to corresponding circumferential positions on the inboard rim, and the weights are secured to the wheel rim in conventional fashion.

As mentioned above, the conventional automobile wheel is acceptably balanced dynamically and it is preferable not to disturb that balance. For this reason the weights used to correct static balance are distributed equally on either side of the central plane of the wheel in order not to affect the dynamic balance.

It is possible to balance almost 100% of the statically unbalanced wheels encountered in wheel servicing with two or three differently weighted rim weights. This is possible by re-orienting the pairs of weights with respect to the light point about the statically unbalanced wheel within the 180° arc of the so-called light side of the wheel. This 180° arc lies upon an opposite side of the neutral axis of the wheel (statically speaking) from the heavy spot determined by the conventional wheel balance indicator. The position on the wheel diametrically opposite the heavy spot is the position of maximum effectiveness for the rim weights. Peripheral movement of the rim weights away from the light spot or position of maximum effectiveness and toward the neutral axis lessens the effectiveness of the weights in counter-balancing the heavy spot and has the same effect as positioning lesser weights at the point of maximum effectiveness. Therefore, a rim weight of a given mass can in effect correct static unbalances requiring a corrective mass equal to its own and a theoretically infinite number of lesser weights down to zero.

The apparatus implementing the process of the invention utilizes a limited number of rim weight values in proportioned amounts which I have discovered as adequate to balance all of a representative number of vehicle wheels with an optimum use of weight material. The apparatus for implementing the invention is a balancing kit comprising a plurality of rim weights of not more than three nor less than two weight values distributed between about ½ ounce and 2½ ounces. Preferably, the article of manufacture contains rim weights of three weight values of approximately 0.60 ounce, 1.60 ounces and 2.25 ounces proportioned numerically in the ratio of 45 to 45 to 10, respectively. It is noted that these three weight values are approximately equal incremental values throughout the weight range specified.

I have found that such an article of manufacture enables wheel balancing businesses to balance effectively 99.7% of the statically unbalanced wheels which they service coincidental with a substantially complete consumption of the several weights constituting the balancing kit.

These and other advantages of the process and apparatus of the invention are described in the following detailed specification and drawings, in which:

FIG. 1 is a schematic plan view of a statically unbalanced wheel resting on a conventional wheel balancing machine;

FIG. 2 is a diagrammatic sectional elevation of the wheel of FIG. 1 showing the placement of rim weights; and FIG. 3 is a diagrammatic representation of the packaged article of manufacture of the invention.

FIGS. 1 and 2 illustrate a wheel 10 having a tire 11 mounted on a demountable rim 12. The demountable rim has an outboard rim portion 14 and an inboard rim portion 15. In FIG. 1 a balance indicator 17 which may be of any conventional type occupies the axle receiving aperture 19 of the demountable rim. A first pair of rim weights 21, 22 are mounted on one side of a light spot of the wheel, as determined from the balance indicator, and a second pair of rim weights 24, 25 are mounted on the other side of the light spot. The light spot, indicated in the drawing by a dotted circle 26, is the point of maximum effectiveness for the pairs of rim weights. It lies diametrically opposite a heavy spot 27 which is a theoretical location indicated by the balance indicator. The wheel is divided into a light side and a heavy side by a neutral axis 28.

In the process of the invention a set of four equal rim weights, which may be divided into two pair of rim weights having equal weight values, are placed on the outboard rim of the wheel immediately adjacent the point of maximum effectiveness or light spot. Preferably, the rim weight set of lightest weight value is utilized first, since a prime consideration is the balancing of the wheel with the the least possible expenditure of material. If the balance indicator shows that the set of weights of smallest value are slightly heavier than needed, the respective weight pairs of the set are moved symmetrically and oppositely about the point of maximum effectiveness until the indicator shows that the wheel is balanced. A possible balancing position is shown by the dotted lines 21A, 22A on the right side of FIG. 1 and the dotted lines 24A, 25A on the left side of FIG. 1.

When wheel balance is indicated, one weight of each pair, say the weights 22 and 25 respectively, are transposed to a similar position on the inboard rim of the wheel. Then each of the weights is fastened to the rim in conventional fashion.

It is possible to determine the rim weight position for perfect static balancing by moving the pairs of rim weights about the point of maximum effectiveness simultaneously on each of the inboard and outboard rim portions. However, since the conventional wheel balancer operates with the plane of wheel rotation horizontal it is simpler to determine the rim weight positions on the upper surface or outboard portion of the wheel and mark the proper position on the wheel before transferring one of each pair of weights to the inboard side.

FIG. 2 illustrates the inboard and outbooard mounting of the rim weights. Weight 24 is mounted on the outboard rim portion and weight 25 is mounted in similar orientation to the light spot on the inboard rim. Rim weight pairs mounted symmetrically with respect to the central plane of rotation do not effect the inherent dynamic balance of the wheel.

Should the balance indicator show that the first pair of rim weights of the lightest value are too light even at the point of maximum effectiveness to overcome the static unbalance of the wheel, the first pair of weights are replaced by rim weights of the next heavier weight value. Thus, the initial position occupied by the weights 21, 22 and 24, 25 in FIG. 1 is occupied by the next heavier rim weights. If these succeeding weights prove to be more than adequate to accomplish balance, then the process of moving the weight pairs symmetrically and oppositely about the point of maximum effectiveness is repeated until wheel balance is indicated. Transposition of the rim weights to the inboard rim is carried out as described above. If the second weight pairs are inadequate, then the still heavier weights, if three values are supplied, are used in the same manner. If only two weight values are available, the heaviest is selected to insure adequacy for substantially any correctable degree of unbalance. Whether the invention is practiced with two or three weight values, the procedure followed is to establish by the technique described the minimum weight sizes adequate for any given wheel.

FIG. 3 illustrates diagrammatically a balancing kit in accordance with a preferred form of the invention. The shaded area A illustrates the proportion of the package or article of manufacture constituting the lightest weights. Shaded area B indicates the proportion of intermediate weights and shaded portion C indicates the proportion of rim weights of heaviest value comprising the article of manufacture. I have found that optimum results are obtained when the lightest weights have a value of approximately 0.60 ounce each, the intermediate rim weight weighs 1.60 ounces and the heaviest weight is 2.25 ounces. These three rim weights, when numerically proportioned in the ratio of 45 light weights to 45 intermediate weights to 10 heavy weights, have been found to balance 99.7% of the wheels serviced by a large wheel balancing organization in an actual field test.

The smallest number of vehicle wheels representing the total range of static unbalance has been found to be approximately 150. Therefore, the preferred balancing kit constitutes 600 rim weights of which 270 rim weights have a weight value of 0.60 and 270 rim weights have a weight value of 1.60 ounces and 60 rim weights have a weight value of 2.25 ounces. A package of rim weights of these specified weight values and numerically proportioned as specified have been found to effectively achieve static balance for 150 wheels with minimum utilization of material for the sum of the wheels. A wheel balancing shop need stock only one kit containing only three values of rim weights and normally resupply is a simple matter of re-ordering a duplicate of the same kit with no necessity for maintaining a standby inventory of 20 different values of rim weights.

I claim:

1. A process for balancing an automobile wheel comprising positioning the wheel horizontally on a wheel-balancing machine, measuring with a high degree of accuracy any deviation of the plane of the wheel from the horizontal, placing a set of four equal rim weights sufficient to balance the wheel loosely on one rim of the wheel adjacent the point of maximum effectiveness, adjusting the rim weights of said set together in pairs symmetrically and oppositely about said point of maximum effectiveness until said wheel is balanced so that it is in a horizontal position, and thereafter transposing one weight from each pair to approximately corresponding circumferential positions on the rim located on the opposite side of the wheel and connecting the weights to the wheel.

2. A process for balancing an automobile wheel comprising positioning the wheel horizontally on a wheel balancing machine, measuring with a high degree of accuracy any deviation of the plane of the wheel from the horizontal, loosely positioning successively heavier sets of four equal rim weights on one rim of the wheel adjacent the point of maximum effectiveness until the lightest of the sets which will balance the wheel is found, adjusting the rim weights of said lightest set together in pairs symmetrically and oppositely about said point of maximum effectiveness until said wheel is balanced so that it is in a horizontal position, and thereafter transposing one weight from each pair to corresponding circumferential positions on the rim located on the opposite side of the wheel and connecting the weights to the wheel.

References Cited in the file of this patent

UNITED STATES PATENTS

| | | |
|---|---|---|
| 2,052,295 | Hume | Aug. 25, 1936 |
| 2,136,633 | Morse | Nov. 15, 1938 |
| 2,341,443 | Hunter | Feb. 8, 1944 |
| 2,383,405 | Merrill et al. | Aug. 21, 1945 |
| 2,700,892 | Lowe | Feb. 1, 1955 |

FOREIGN PATENTS

| | | |
|---|---|---|
| 731,459 | Great Britain | June 8, 1955 |